United States Patent [19]

Pressau

[11] 4,385,951
[45] * May 31, 1983

[54] LOW PRESSURE LAMINATION OF SAFETY GLASS

[75] Inventor: Jean P. Pressau, Evans City, Pa.

[73] Assignee: PPG Industries, Inc., Pittsburgh, Pa.

[*] Notice: The portion of the term of this patent subsequent to Jul. 27, 1999, has been disclaimed.

[21] Appl. No.: 247,465

[22] Filed: Mar. 25, 1981

[51] Int. Cl.³ .................. B32B 17/00; C09J 5/02
[52] U.S. Cl. .................. 156/105; 156/106; 156/308.6; 428/437
[58] Field of Search ........ 156/105, 107, 228, 280, 156/299, 295, 308.6, 300, 99, 102, 103, 104, 106, 329; 428/436, 437

[56] References Cited

U.S. PATENT DOCUMENTS

| | | | |
|---|---|---|---|
| 1,809,276 | 6/1931 | Johnston | 156/105 |
| 1,909,444 | 5/1933 | Worrall | 156/105 |
| 2,833,680 | 5/1958 | Kneeling | 156/105 |
| 3,449,184 | 6/1969 | Balk | 156/105 |
| 4,268,332 | 5/1981 | Winders | 156/280 |
| 4,341,576 | 7/1982 | Lewis | 156/106 |

FOREIGN PATENT DOCUMENTS

| | | | |
|---|---|---|---|
| 323783 | 1/1930 | United Kingdom | 156/105 |
| 355604 | 8/1931 | United Kingdom | |

*Primary Examiner*—Edward C. Kimlin
*Assistant Examiner*—Louis Falasco
*Attorney, Agent, or Firm*—Edward I. Mates

[57] ABSTRACT

A laminated glass product is produced without an autoclave by a technique that applies an excess of liquid plasticizer to each upwardly facing interfacial surface of an assembly to be laminated in various stages of assembly while said upwardly facing surface is exposed to ensure the absence of air bubbles in the ultimate laminated product.

11 Claims, No Drawings

LOW PRESSURE LAMINATION OF SAFETY GLASS

BACKGROUND OF THE INVENTION

1. Field of the Invention

The present invention relates generally to the lamination of safety glass products, usually comprising one or more layers of interlayer material that adhere two or more glass sheets together. The term "glass sheets" includes silica glass compositions and rigid plastic sheets composed of well known substitutes for glass such as polycarbonates, acrylics, polyurethanes, polyesters and the like. The glass sheets laminated together may comprise one or more sheets of heat strengthened glass or at least one of the glass sheets may contain a coating for decorative or other functional purpose, such as serving as a heat screen.

Safety glass is conventionally made by sandwiching a layer of plastic material between two sheets of glass. The laminate usually includes an interlayer of plasticized polyvinyl butyral which bonds the glass sheets together. To obtain the intimate contact at the interfacial surfaces, which is necessary to obtain a suitable lamination, air is first excluded from the interfacial surfaces between the sheets forming the assembly to be laminated by pre-pressing, followed by final lamination.

In one pre-pressing technique, the assembly is passed while heated between a pair of rubber rolls. Another technique for pre-pressing is to apply a flexible open wall ring about the periphery of the assembly and evacuate the interfacial surfaces through the peripheral chamber formed by enclosing the periphery of the assembly within the lips of the open wall ring and heating the assembly to bond the sheets together sufficiently to prepare the assembly for final lamination in an autoclave. The latter step is performed by exposing the assembly to either air or oil at an elevated temperature and pressure in a large and expensive pressurized autoclave. In the autoclave, the assembly of two relatively rigid plies of glass separated by a relatively soft interlayer is subjected to heat and pressure for a suitable length of time. As a result of the exposure in the autoclave, an irreversible deformation of the interlayer takes place. This causes the interfacial surfaces of the interlayer to conform and to develop a strong adhesive bond to the interfacial surfaces of the glass sheets. However, the autoclave process is expensive and wasteful of energy. It would be preferable to develop a less expensive process to fabricate laminated glass products, particularly a technique that avoids the necessity for a pre-pressing step followed by final lamination under autoclave conditions.

Laminated safety glass units used in overhead glazing and in sloped glazing installations are composed of glass sheets that are heat strengthened, particularly glass sheets whose heat strengthening is accomplished while the glass sheets are conveyed along a roller-type conveyor. Such heat strengthening involves heating the glass sheet to a temperature at which the surfaces soften somewhat followed by a cooling step in which the sheets develop a stress gradient comprising a compression stress at the surface and an interior tension stress. Since the softened surfaces of the glass sheet roll over the roller conveyor during heat strengthening, they develop a wave and, therefore, are not as flat as sheets that require less heat during their processing, such as sheets that are annealed or brought to a lower stress configuration.

When glass sheets are thermally processed while conveyed on a roller conveyor, they tend to develop a warp in which one major surface becomes convexly curved and the other major surface concavely curved, depending upon the temperature cycle to which the opposite major surfaces are exposed during the thermal treatment required for heat strengthening. The warp that results is a function of the magnitude of the stress gradient developed through the thickness of the glass sheets as a result of the heat strengthening operation.

In addition, a rectangular glass sheet tends to curl at its corners as a result of the temperature cycle to which it is exposed during heat strengthening. Since the leading edge of the glass sheet has a different thermal history than the trailing edge thereof, the curl at the leading edge corners develops a different configuration from that of the trailing edge corners.

It is more difficult to laminate sheets that have been warped as a consequence of being heat strengthened than to laminate flatter glass sheets having a lower stress pattern that results from annealing. Furthermore, these laminated products may require glass sheets, one or both of which are provided with a coating that reduces the transmission of high energy radiation through the ultimate laminate. The application of heat screening coatings to glass surfaces involves heating the glass to a temperature at which its major surfaces are likely to soften. The heat strengthened glass, regardless of whether it is merely strengthened to improve the resistance of the ultimate product to penetration by foreign objects or whether the sheets are heated in the process of applying a coating to their major surface, develops a warped surface that makes it more difficult to laminate the heat strengthened glass sheets to opposite sides of an interlayer. Glass sheets are easier to laminate when they are oriented to one another so that their top and bottom major surfaces face in the same directions and their leading and trailing edges are aligned and registered.

An interlayer suitable for use in the fabrication of laminated safety glass is preferably a plasticized polyvinyl acetal. Polyvinyl butyral plasticized with triethylene glycol di-2-ethyl butyrate (popularly called "3GH") is a common interlayer. Sheets of such interlayer material are usually supplied with surfaces that are patterned. The patterns on the major surfaces of the interlayer are such as to provide passageways for the removal of entrapped vapors such as air or moisture. The grooves in the patterns are removed by the high pressure that takes place in the autoclave.

It has been suggested that glass sheets be laminated to interlayers by immersing an assembly of alternate sheets of glass and interlayer material within a bath containing a plasticizer and allowing the plasticizer to help unite the interfacial surfaces by the application of heat, although if no hurry is indicated, lamination could take place over an extended period of time at temperatures on the order of room temperatures. Such a technique made it necessary for an operator to wash excess plasticizer from the outer surfaces of the resulting laminated unit. In addition, laminated units produced from units assembled within a bath often had bubbles, which detracted from the commerical value of the units so produced.

Nevertheless, the need exists for a relatively inexpensive process of fabricating transparent, laminated units for relatively small orders of custom sizes that make it impractical to use expensive autoclave equipment.

2. Description of Patents of Interest

British Pat. No. 355,604 to Newtex Safety Glass Co. discloses a method of making a laminate containing a sheet of cellulose acetate between two sheets of glass. A first sheet of glass is laid into a suitable bath of a resin in the A stage of its manufacture. A cellulose acetate sheet is laid on the glass sheet within the bath, and the second glass sheet is laid over the cellulose acetate in the bath. The resultant assembly is removed from the bath, excess bath is wiped off from the outer surfaces of the assembly and the surplus bath composition is removed from between the layers by gentle hand pressure. The resultant assembly is placed in a suitable press and pressed at a pressure of 200 pounds per square inch and at a temperature of 90° to 130° centigrade for forty minutes. This immersion is alleged to avoid areas of non-adhesion between adjacent layers of the assembly. This patent requires waiting for all the layers to be assembled before hand pressure is applied. Therefore, some bubbles that form during assembly cannot be removed. In addition, this patent requires autoclave pressures to accomplish acceptable results.

U.S. Pat. No. 3,449,184 to Balk eliminates the need for an expensive autoclave to complete the lamination of laminated glass products by immersing alternate sheets of glass and interlayer material in a bath of liquid plasticizer material to inundate the sheets in the bath and arranges the sheets in laminate relation to one another while immersed within the bath. Allegedly this process may be accomplished in anywhere from one half hour to several hours at room temperature but the process may be accelerated by subjecting products being cured to heat. Unfortunately, the quality of articles so produced does not always meet the commercial standards required for present day products because of the presence of bubbles. It is impossible to remove such bubbles while the assembly remains immersed within the bath, and, like the Newtex patent, has great difficulty in removing certain bubbles when bubble removal attempts are started only after the assembly is removed from the bath. In addition, working in a bath of plasticizer is very messy and requires the removal of plasticizer from the outer surfaces of the unit when the latter is removed from the bath.

It is believed that the bubbles that form in the laminated products produced by the aforesaid reference patents result from eddy currents that take place during the assembly of sheets within a bath. These eddy currents, which cannot be controlled, sometimes cause bubbles in the film between the interfacial surfaces of the adjacent sheets of the assembly in the laminate. When the individual layers are assembled within a bath of plasticizer material, it is difficult to observe whether such bubbles are present. Hence, it is difficult to determine whether such bubbles require removal from the interfacial surfaces of the assembly in sufficient time to allow lamination to take place with the complete avoidance of bubbles, a necessity when complying with the requirements for present day commerical products. Furthermore, there is no known way of removing an interfacial bubble from an assembly while the assembly is immersed within a bath of plasticizer material during the layup of its components.

SUMMARY OF THE PRESENT INVENTION

According to the present invention, the preliminary pressing steps and the use of an immersion bath and an autoclave are eliminated. Instead, in its broadest sense, the present invention comprises a method of making a laminated safety glass unit comprising at least two sheets of glass and an interlayer of plasticized interlayer material containing sufficient plasticizer to adhere to glass in a temperature range above room temperature and below a temperature at which said plasticizer develops volatile products, said method comprising:

(a) supporting a first glass sheet on an esentially horizontal support surface (which may be at an oblique angle not exceeding approximately five degrees) in such a manner that the lower major surface of said glass sheet is in contact with said support surface throughout substantially its entire extent and its upper surface is exposed, (b) applying an excess of liquid plasticizer substantially only to the entire exposed upper surface of said first glass sheet so supported to form a continuous coating that is free of bubbles over said entire upper surface, (c) applying a sheet of plasticized interlayer material having patterned major surfaces to said continuous coating to form a preassembly, in such a manner that said sheet of plasticized interlayer material contacts said continuous coating throughout essentially its entire extent while its upper surface is exposed, (d) applying an excess of liquid plasticizer substantially only to the entire exposed upper surface of said plasticized sheet to form a continuous coating that is free of bubbles over said latter entire exposed surface, (e) applying a second glass sheet over said latter continuous coating until it makes continuous contact therewith to form an assembly, (f) subjecting said assembly to an atmosphere that excludes an expensive autoclave and provides a temperature range between room temperature and the temperature at which said plasticizer develops a volatile product and to a superatmospheric pressure not more than two atmospheres until said sheets are completely laminated to one another.

Since liquid plasticizer is applied to only the upwardly facing interfacial surfaces of the assembly to be laminated when said surfaces are exposed, it is possible to inspect the assembly during various stages of its assembly for bubbles. If a bubble is observed, it can be removed by applying pressure, either by hand or by a rolling force toward an edge of the preassembly or assembly before the next layer is applied.

Preferably the sheet of plasticized interlayer material is applied in essentially unwrinkled condition over the first continuous coating of plasticizer by supporting the plasticized sheet in an essentially horizontal configuration, with its opposite ends supported at a higher elevation than its portion intermediate its opposite ends. The plasticized sheet is lowered until its intermediate portion makes a continuous line of contact with the continuous coating that extends transverse to a line interconnecting the opposite ends, and continuing to lower the portions of the plasticized sheet in such a manner as to extend the continuous line of contact into a continuous area that extends in opposite directions to the ends of the plasticized sheet until the sheet of plasticized interlayer material is applied over said continuous coating of plasticizer entirely.

The second glass sheet is preferably applied over the second named continuous coating by lowering an edge of the second glass sheet to engage a corresponding edge of the upper surface of the plasticized sheet in such a manner as to support the lowered edge of the second glass sheet on an edge of the plasticized sheet with the continuous coating between the second glass sheet and the plasticized sheet. The second glass sheet is lowered by pivoting the latter about its said initially supported edge until the entire second glass sheet is in contact with the second-named continuous coating. The preferred interlayer sheet is plasticized polyvinyl butyral. The liquid plasticizer used is preferably the same plasticizer used to plasticize the sheet of interlayer material. The liquid plasticizer preferably contains an ingredient selected from the class consisting of triethylene glycol di-2-ethylbutyrate, dibutyl sebacate, hexadecyl alcohol, di-n-hexyl adipate, butyl benzl phthalate and tetraethylene glycol di-n-hexanoate.

The method of this invention can be used in assembling more layers of alternate sheets of interlayer material and sheets of glass by providing augmented assemblies containing at least two sheets of interlayer material and at least three glass sheets each of which is treated only on its upper surface that forms an interfacial surface. The present invention is also suitable for assembling a stack of assemblies or augmented assemblies or mixtures of assemblies with augmented assemblies wherein each layer in turn that forms part of an interfacial surface of the assembly has its upper surface completely covered with an excess of liquid plasticizer applied in such a manner that the upper surface is exposed so as to avoid the presence of empty areas that form bubbles in the interfacial surface after the next succeeding layer or sheet is applied. In forming a stack of assemblies and/or augmented assemblies, the upper surface of the upper glass sheet of the previous assembly is exposed and the lower surface of the first glass sheet of the next assembly is applied in surface to surface contact against said last named upper surface without applying any liquid plasticizer to the interfacial surface between adjacent assemblies of the stack to exclude plasticizer from the interfacial surface between adjacent assemblies.

These and other benefits of the present invention will be understood better in the light of a description of specific embodiments that follow:

DESCRIPTION OF THE PREFERRED EMBODIMENTS

In a specific embodiment of the present invention, two or more rectangular glass sheets (preferably float glass, and more preferably, float glass that has been heat strengthened and/or provided with a heat screening coating) is laminated to another heat strengthened glass sheet which may or may not be coated with a heat screening coating to provide a laminated transparency for use in overhead glazing which is usually installed at an oblique angle. In order to avoid the problems of the prior art in which it was difficult to handle the sheets within a liquid plasticizer bath, the present invention provides a solid support surface for supporting a first sheet of glass in face-to-face contact. The solid support surface is preferably at an essentially horizontal orientation, but may be oriented at a small angle to the horizontal and is provided with a pair of pegs to insure that an edge of the glass sheet is aligned properly along its longer dimension. Another peg is mounted to guide the positioning of its shorter dimension while the longer side edge is so aligned.

A first glass sheet is mounted on the essentially horizontal support (which may be at an angle of not more than five degrees to the horizontal) and flooded over its entire exposed upper surface with an excess of liquid plasticizer. Then, a matching sheet of polyvinyl butyral 15 to 60 mils (0.4 to 1.5 millimeters) thick is applied in unstretched and unwrinkled condition over the upper surface of the first glass sheet after it has been determined that the continuous layer of plasticizer of the type used to plasticize the interlayer material is free of bubbles. An excess of plasticizer is applied over the exposed upper surface of the sheet of plasticized interlayer material and at room temperature the coating of liquid plasticizer has a thickness of approximately 0.8 millimeters which corresponds to approximately 1/32 inch. After it has been determined that no bubbles are present in the coating of plasticizer, a second glass sheet is mounted with its edge over the corresponding edge of the coated interlayer. The second glass sheet is gradually lowered onto the upper coated surface of the plasticized sheet to form a continuous covering for the second coating of plasticizer. The second glass sheet is gradually lowered by being pivoted about the edge that makes the initial contact with the edge of the plasticized sheet.

The benefit of applying liquid plasticizer to the upper surface only of the first glass sheet and of the interlayer sheet as taught by the present invention is that each upper surface being treated with plasticizer is the only major surface at each step that is so exposed when so treated. Such exposure is not possible when assembly takes place within a bath of a plasticizer. Hence, the present invention makes it possible to correct for any areas containing a bubble before the assembly proceeds to the next stage.

When the sub-assembly containing a layer of interlayer material over the first glass sheet is completed, it is possible to inspect the resulting assembly or sub-assembly, and, if a bubble is seen, a roll applies a light rolling action across the upper surface and toward the closest edge of the sub-assembly to force some of the excess plasticizer to replace the bubble and force the bubble from the interface between the adjacent layers to the edge of the interfacial area of the sub-assembly. This is repeated, if needed, after each layer of the assembly or sub-assembly is applied over the additional coating of plasticizer it covers.

EXAMPLES

Initial experiments were performed with sets of ten specimens, each specimen comprising a sandwich of two layers of glass and an interlayer of plasticized polyvinyl butyral. The individual layers of each specimen were supported on a flat surface against alignment pins and excess plasticizer was applied to the upper exposed surface of each layer in turn, except for the uppermost layer of the specimen. Each set of specimens in the first group of experiments was subjected to a unique combination of soaking time at room temperature and no pressure followed by low pressure (4.7 pounds per square inch or 3200 Pascals) at a time and temperature selected for the set of specimens. The specimens were inspected for optical properties after such treatment.

Excellent optical properties were observed with specimens of two glass sheets and an interlayer sheet of plasticized polyvinyl butyral that were allowed to soak for one day at room temperature followed by 16 hours of laminating at a pressure of 4.7 pounds per square inch (3200 Pascals) and a laminating temperature of 80 degrees centigrade. Additional assemblies were permitted to soak at room temperature for one day followed by 16 hours of lamination at a laminating pressure of 4.7 pounds per square inch (3200 Pascals) and a laminating temperature of 20 degrees centigrade. The latter specimens had good transmission properties, but not as good as the excellent transmission properties of those laminated at 80 degrees centigrade. Excellent results were obtained with ten specimens that were soaked at room temperature for one day followed by laminating at a pressure of 4.7 pounds per square inch (3200 Pascals) for 6 hours at 80 degrees centigrade. An additional ten specimens were soaked at room temperature for one day and then laminated at 20 degrees centigrade at a pressure of 4.7 pounds per square inch (3200 Pascals) for 6 hours. Poor optics resulted from these latter ten specimens. Additional specimens that were assembled in the manner previously described and allowed to soak for one day at room temperature followed by laminating for 30 hours at a pressure of 4.7 pounds per square inch (3200 Pascals) and a temperature of 20 degrees centigrade exhibited excellent optical properties. However, 30 hours of laminating time is too slow for practical commercial application.

An additional 10 specimens, which were subjected to one day of soaking at room temperature followed by 24 hours of lamination at a laminating pressure of 4.7 pounds per square inch (3200 Pascals) and at a temperature of 20 degrees centigrade, also produced excellent optical properties. An additional set of ten specimens was permitted to soak for one day at room temperature followed by lamination of a pressure of 4.7 pounds per square inch (3200 Pascals) for 72 hours at 20 degrees centigrade. This treatment yielded excellent optical properties in the laminated specimens.

Ten additional assemblies were assembled in the manner previously described and subjected to 6 hours of soaking at room temperature followed by 24 hours of lamination at 120 degrees centigrade at a pressure of 4.7 pounds per square inch (3200 Pascals) and developed excellent optical properties. An additional ten assemblies soaked at room temperature for 6 hours followed by 48 hours of lamination at room temperature at a laminating pressure of 4.7 pounds per square inch (3200 Pascals) also developed excellent optical properties. An additional 10 specimens assembled in the described manner soaked at room temperature for 6 hours followed by 40 hours of lamination at 4.7 pounds per square inch (3200 Pascals) at a laminating temperature of 120 degrees centigrade developed excellent optical properties.

Other specimens having interlayers of polyvinyl butyral plasticized with dibutyl sebacate were also tested by applying dibutyl sebacate plasticizer during the assembly steps. Excellent transmission results were obtained from ten specimens soaked for 6 hours at room temperature with dibutyl sebacate followed by 48 hours of lamination at a laminating pressure of 4.7 pounds per square inch (3200 Pascals) at 80 degrees centigrade. An additional ten specimens prepared using dibutyl sebacate plasticizer and soaked at room temperature for 6 hours followed by 16 hours of the aforesaid laminating pressure at 80 degrees centigrade had good optical properties. Ten additional specimens containing interfacial coatings of dibutyl sebacate plasticizer showed excellent optical properties on inspection after 6 hours of soaking at room temperature followed by 16 hours of laminating time at 20 degrees centigrade at a pressure of 4.7 pounds per square inch (3200 Pascals). Other sets of 10 specimens, each containing dibutyl sebacate plasticizer at the interfaces subjected to 6 hours of soaking at room temperature followed by the following treatments: 1 set at 120 degrees centigrade for 72 hours, another set for 24 hours at 120 degrees centigrade, a third set at 120 degrees centigrade for 40 hours, and a fourth set for 40 hours at 20 degrees centigrade all at a laminating pressure of 4.7 pounds per square inch (3200 Pascals), produced laminates having excellent optical properties.

Having determined the feasibility of the operation for laminating single assemblies, additional efforts were directed to assembling a plurality of assemblies and stacking the plurality of assemblies in a stack. The following operating parameters were developed: 2 heat strengthened sheets of float glass having a nominal thickness of ¼ inch (6.3 millimeters) or ⅛ inch (3.1 millimeters), one being coated and the other being clear, were laminated with plasticized polyvinyl butyral using as a plasticizer the same plasticizer used to plasticize the polyvinyl butyral, namely Flexol 3GH (triethylene glycol di-2-ethyl butyrate) or DBS (dibutyl sebacate) or Santicizer 332 (a plasticizer containing 75 parts by weight of di-n-hexyl adipate plus 25 parts by weight of butyl benzyl phthlate). A treatment comprising two hours of soaking time for laminates made with triethylene glycol di-2-ethyl butyrate plasticizer followed by 10 hours of a lamination step at 175 degrees Fahrenheit (79 degrees centigrade) and 4.7 pounds per square inch pressure (3200 Pascals) produced 100% lamination, which provided excellent optics throughout the entire extent of the laminated units. Suitable results were also obtained when the lamination step was terminated at 8 hours. However, for commercial operations, the lamination step was continued for 10 hours to ensure an adequate product. When the lamination was performed at temperatures in excess of 100 degrees centigrade, water bubbles were observed in the ultimate product. These bubbles were investigated and found to be related to a high moisture content in the interlayer developed by storing the interlayer sheets at room temperature at 40% relative humidity. This problem was avoided subsequently by storing interlayer sheets at relative humidities not exceeding 20% at room temperature for at least 24 hours.

It is understood that while a stack comprising several assemblies could be made, seven being suitable for production purposes, that is also within the purview of the present invention to provide augmented assemblies containing two or more interlayers alternating with three or more glass sheets. The same parameters appear to be applicable for the laminate to form an ultimate product having good optical properties.

It has been observed that during the soaking of laminates containing triethylene di-2-ethyl butyrate (3 GH) at room temperature, 1.5 grams per square centimeter is absorbed per hour during soaking at room temperature. In interlayers of 30 mils (0.76 millimeters) thickness and interlayers of 60 mils (1.52 millimeters) thickness, the amount of plasticizer absorbed is insufficient to normalize throughout the thickness of the interlayer during the two hours of soak time which appears to be maximum time necessary to soften and dissolve the ribs formed on the patterned surfaces of the interlayer material sufficiently to obtain results that correspond approximately to the results obtained by prepressing in the prior art that continued with a final lamination step in a high pressure, high temperature autoclave. Particular ribs are 1.5 to 2 mils (0.038 to 0.051 millimeters) deep and there are spaces 26 mils (0.66 millimeters) wide between ribs.

A commercial operation developed to produce laminates approximately 59 inches (150 centimeters) long and 52 inches (132 centimeters) wide of two glass sheets 221 mils (5.6 millimeters) thick of heat strengthened clear float glass laminated to an interlayer of plasticized polyvinyl butyral 60 mils thick plasticized with triethylene glycol di-2-ethyl butyrate involved a two hour soaking period at room temperature followed by 10 hours of lamination at 180 degrees Fahrenheit (82 degrees centigrade) at a pressure of 4.7 pounds per square inch (3200 Pascals). This operation made commercially acceptable laminates in stacks of seven assemblies in height. In another example, a pair of clear float glass sheets having ⅛ inch (3.1 millimeters) nominal thickness was laminated to a 60 mil (1.52 millimeters) thick interlayer of polyvinyl butyral plasticized with triethylene glycol di-2-ethyl butyrate.

The glass sheets were 76 inches (193 centimeters) long and 34 inches (86 centimeters) wide. A stack seven assemblies high was fabricated using a 2 hours soak time and 8 hours of lamination at a pressure of 4.7 pounds per square inch (3200 Pascals) and a temperature of 180 degrees Fahrenheit (82 degrees centigrade).

In laminating glass sheets having major surfaces that are bowed as a result of a heat strengthening process, it is recommended that the first glass sheet be applied directly to a support surface with its bowed surface facing upward and with the support surface completely clean. The glass sheet is registered against pins on two adjacent edges with its upper edge exposed and its bottom edge against the support surface. Plasticizer is applied in liquid form over the upper surface of the first glass sheet in excess until it completely covers the upper surface of the first glass sheet and flows over its edge. A sheet of plasticized polyvinyl butyral having patterned surfaces is supported over the coating of plasticizer with its more deeply ribbed surface facing down. Two operators hold the plasticized sheet in unwrinkled condition with a slight droop in the middle. They lower the plasticized sheet until the lowered middle portion engages the liquid plasticizer along a transversely extending line. The plasticized sheet is lowered until the line of contact becomes an area of contact over the entire coating of plasticizer. The plasticized sheet is aligned with the pins along two adjacent edges and is slightly longer and wider than the first glass sheet so that the excess extends beyond the edges of the first glass sheet. Any air bubbles trapped between the plasticized sheet and the first glass sheet are removed by applying a paint roller along the upper surface of the plasticized sheet toward the edge of the sheets. An excess of liquid plasticizer is dispensed onto the upper exposed surface only of the plasticized polyvinyl butyral sheet until the excess flows over the edge of the preassembly so formed. A second glass sheet is applied with its bow facing upward over the liquid plasticizer coating. A first edge of the second glass sheet is mounted on the edge of the plasticized sheet that engages a pair of pins. The line of contact is used as a pivot axis to lower the rest of the glass sheet against the plasticized sheet to force air bubbles out of the plasticizer. If any bubbles develop during this assembly step, pressing by hand at a point between the geometric center of the second glass sheet and the bubble forces the bubble to the edge of the assembly where it is expelled.

If it is desired to build a stack of assemblies for simultaneous lamination, a first glass sheet is mounted directly against the second glass sheet of the assembly just completed without applying any plasticizer to the upper surface of the second glass sheet of the previous assembly and the steps taken to assemble the first assembly are repeated for as many assemblies desired in the stack (usually up to ten).

The stack of assemblies is soaked at room temperature without any additional pressure for from fifteen minutes to two hours after the stack is completed. One half hour of soaking is preferred.

A press applies a pressure of 4.7 to 7.7 pounds per square inch (3200 to 5200 Pascals). All excess plasticizer from the previous steps is collected and filtered for reuse.

The assembly, while subjected to the low pressure, is heated to 225 degrees Fahrenheit (117 degrees centigrade) for one to ten hours after the elevated temperature is reached. Preferred minimum laminating times are one hour for a stack of one to two assemblies, two hours for a stack of three to five assemblies and three hours for a stack of six to eight assemblies.

After the temperature and pressure exposure is completed, the laminates are removed from the press and razor blades are used to trim the excess plasticized interlayer material that extends beyond the margin of the glass sheets. The laminates are ready for inspection and shipping after they are run through a commercial washer.

The form of the invention shown and described herein represents an illustrative preferred embodiment and certain modifications thereof. It is understood that various changes may be made without departing from the gist of the invention as defined in the claimed subject matter which follows:

I claim:

1. A method of making laminated safety glass suitable for use in glazing closures comprising at least two glass sheets and an interlayer of plasticized interlayer material containing sufficient plasticizer to adhere to glass in the temperature range above room temperature and the temperature at which said plasticizer develops volatile products, said method comprising:
   (a) supporting a first glass sheet on an essentially horizontal solid support surface with its upper surface exposed and its lower major surface in essentially continuous contact with said support surface,
   (b) applying an excess of liquid plasticizer substantially only to the entire exposed upper surface of said first glass sheet so supported to form a continuous coating over said entire exposed upper surface,
   (c) applying a sheet of plasticized interlayer material having patterned major surfaces to said continuous coating with its upper surface exposed to form a preassembly in such a manner as to avoid the presence of bubbles,
   (d) applying an excess of liquid plasticizer substantially only to the entire exposed upper surface of said sheet of plasticized interlayer material to form a continuous coating over said latter entire exposed upper surface, (e) applying a second glass sheet over said latter continuous coating to form an assembly in such a manner as to avoid the presence of bubbles, and (f) subjecting said assembly to an atmosphere that excludes an autoclave, said atmosphere providing a temperature range between room temperature and the temperature at which said plasticizer develops a volatile product and a superatmospheric pressure not more than two atmospheres until said sheets are completely laminated to one another.

2. The method as in claim 1, wherein said assembly is inspected for bubbles after applying each sheet over one or the other continuous coatings of liquid plasticizer, and, if a bubble is observed, applying a rolling force to the upper exposed surface of said sheet toward the edge of said sheet to remove said bubble from said continuous coating.

3. The method as in claim 1 or claim 2, wherein said sheet of plasticized interlayer material is applied in essentially unwrinkled condition over said first named continuous coating by supporting said plasticized sheet in an essentially horizontal configuration with its opposite ends supported at a higher elevation than its position intermediate its opposite ends, lowering said plasticized sheet until its intermediate portion makes a continuous line of contact with said continuous coating that extends transverse to a line interconnecting said opposite ends, and continuing to lower the portions of said plasticized sheet in such a manner as to extend said continuous line of contact into a continuous area that extends in opposite directions to said ends until said sheet of plasticized interlayer material is applied over said entire continuous coating.

4. The method as in claim 1 or claim 2, wherein said second glass sheet is applied over said second named continuous coating by applying a first edge of said second glass sheet to a corresponding first edge of the upper surface of said plasticized sheet in such a manner as to maintain said continuous coating between said second glass sheet and said plasticized sheet, and lowering said second glass sheet by pivoting said second glass sheet about its said first edge until the entire second glass sheet is in contact with said second named continuous coating.

5. The method as in claim 1 or claim 2, wherein said plasticized sheet is composed of plasticized polyvinyl butyral.

6. The method as in claim 1 or claim 2, wherein said liquid plasticizer is the plasticizer that is used to plasticize said sheet of interlayer material.

7. The method as in claim 6, wherein said liquid plasticizer contains an ingredient selected from the class consisting of triethylene glycol di-2-ethyl butyrate, dibutyl sebacate, hexadecyl alcohol, di-n-hexyl adipate, butyl benzyl phthalate, and tetraethylene glycol di-n-hexanoate.

8. The method as in claim 1, followed by the additional steps of assembling additional alternate sheets of plasticized interlayer material and of glass to form an augmented assembly with the application of an excess of liquid plasticizer to the entire exposed upper surface of each said sheet of said augmented assembly to form a continuous coating over the entire exposed upper surface, said additional steps being performed prior to subjecting said augmented assembly to said temperature range and superatmospheric pressure.

9. The method as in claim 1, followed by the additional steps of assembling one or more additional assemblies in the manner of the method of claim 1 to form a plurality of assemblies prior to subjecting the plurality of assemblies to said temperature range and said superatmospheric pressure, the first glass sheet of each of said additional assemblies being mounted in direct surface to surface contact with the upper glass sheet of the previous assembly in the absence of any liquid plasticizer threbetween.

10. The method as in claim 8, followed by the additional steps of assembling one or more additional assemblies or augmented assemblies to form a plurality of augmented assemblies prior to subjecting the plurality of augmented assemblies being mounted in direct surface to surface contact with the upper glass sheet of the previous assembly or augmented assembly in the absence of any liquid plasticizer therebetween.

11. The method as in claim 1 or claim 2, wherein said glass sheets to be laminated are heat strengthened while oriented to provide a given leading edge and a given trailing edge, thereby developing major surfaces that are bowed, comprising applying said first heat strengthened glass sheet directly to said support surface with its bowed surface facing upwardly, and applying said second heat strengthened glass sheet over said latter continuous coating with its bowed surface facing upwardly and oriented so that its leading and trailing edges are oriented and aligned with the corresponding leading and trailing edges of said first heat strengthened glass sheet.

* * * * *